United States Patent
Kim

(10) Patent No.: US 9,355,683 B2
(45) Date of Patent: May 31, 2016

(54) AUDIO PLAYING METHOD AND APPARATUS

(75) Inventor: Jung-dae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 675 days.

(21) Appl. No.: 12/847,503

(22) Filed: Jul. 30, 2010

(65) Prior Publication Data

US 2012/0029668 A1    Feb. 2, 2012

(51) Int. Cl.
| | | |
|---|---|---|
| G06F 17/00 | (2006.01) | |
| G11B 27/28 | (2006.01) | |
| G11B 27/00 | (2006.01) | |
| G11B 27/034 | (2006.01) | |
| G11B 27/34 | (2006.01) | |
| G11B 27/02 | (2006.01) | |

(52) U.S. Cl.
CPC .............. *G11B 27/28* (2013.01); *G11B 27/007* (2013.01); *G11B 27/034* (2013.01); *G11B 27/34* (2013.01); *G11B 27/02* (2013.01)

(58) Field of Classification Search
USPC ............................................. 715/769; 700/94
See application file for complete search history.

(56) References Cited

U.S. PATENT DOCUMENTS

| | | | | |
|---|---|---|---|---|
| 4,375,083 | A * | 2/1983 | Maxemchuk | 704/278 |
| 6,134,695 | A * | 10/2000 | Sasaki et al. | 714/752 |
| 6,249,765 | B1 * | 6/2001 | Adler et al. | 704/500 |
| 7,627,473 | B2 | 12/2009 | Gunawardana et al. | |
| 2003/0074195 | A1 | 4/2003 | Bartosik et al. | |
| 2006/0085190 | A1 | 4/2006 | Gunawardana et al. | |
| 2007/0212030 | A1 | 9/2007 | Koga et al. | |
| 2007/0260457 | A1 * | 11/2007 | Bennett et al. | 704/235 |
| 2008/0013757 | A1 * | 1/2008 | Carrier | 381/119 |
| 2008/0019664 | A1 * | 1/2008 | Matsunaga | 386/53 |
| 2010/0259688 | A1 * | 10/2010 | Zoetekouw et al. | 348/700 |

FOREIGN PATENT DOCUMENTS

| | | | |
|---|---|---|---|
| CN | 1760974 A | 4/2006 | |
| EP | 1014279 A1 | 6/2000 | |
| JP | 9-62296 A | 3/1997 | |
| JP | H0962296 A * | 3/1997 | G06F 17/30 |
| JP | 2000-242465 A | 9/2000 | |
| JP | 2004-110944 A | 4/2004 | |
| JP | 2005-109928 A | 4/2005 | |
| KR | 10-0357241 B1 | 10/2002 | |
| WO | WO 0239450 A2 | 5/2002 | |

OTHER PUBLICATIONS

Communication issued on Oct. 11, 2011 by the European Patent Office in the counterpat European Patent Application No. 11175419.8.

(Continued)

*Primary Examiner* — Fan Tsang
*Assistant Examiner* — David Siegel
(74) *Attorney, Agent, or Firm* — Sughrue Mion, PLLC

(57) ABSTRACT

Provided are a method and apparatus thereof for setting a marker within audio information, the method including: receiving the audio information including a silent portion and a non-silent portion; receiving a selection for a selected marker insertion point; determining, based on the received selection and received audio information, whether the selected marker insertion point occurs during the non-silent portion; and if the selected marker insertion point occurs during the non-silent portion, determining a time of the silent portion, and setting the marker to correspond to the determined time of the silent portion.

32 Claims, 8 Drawing Sheets

(56) References Cited

OTHER PUBLICATIONS

Communication dated Apr. 3, 2015 issued by The State Intellectual Property Office of P.R. of China in counterpart Chinese Application No. 201110220093.5.

Communication dated Mar. 10, 2015 issued by Japanese Intellectual Property Office in counterpart Japanese Patent Application No. 2011-166260.

Communication issued Jan. 26, 2016 by the Japanese Patent Office in counterpart Japanese Application No. 2011-166260.

* cited by examiner

400

410    420    430  440

AUDIO PLAYING METHOD AND APPARATUS

BACKGROUND OF THE INVENTION

1. Field of the Invention

Apparatuses and methods consistent with the present invention relate to a method and apparatus for playing audio, and more particularly, for replaying a portion of audio information as desired by a user.

2. Description of the Related Art

Some modern methods and apparatuses allow the playing of audio information. As used herein, the term "audio information" includes both verbal and non-verbal information. Verbal audio information includes words, phrases, sentences, paragraphs, etc., or other uttered sounds (e.g., syllables or fragments of words, etc.). Such verbal audio information may be spoken or expressed in musical form (e.g., spoken words or uttered sounds produced with or without musical accompaniment). Non-verbal information includes music (i.e., without words), coded audio signals (e.g., Morse code), wordless tone (e.g., humming), etc. Some such apparatuses and methods further allow a user to select a replay starting point, i.e., a point in time at which she would like a replay operation to begin replaying of audio information.

In these related art methods and apparatuses a user may unintentionally select a different point in time from what she intended. For example, a user might listen to a portion of an audio book, a song, etc., and want to set a marker to coincide with the end of a sentence, stanza, etc. Upon hearing the desired portion, the user may press a button or click a mouse to initiate the insertion of a marker to designate the replay starting point. However, the user may press the button or click the mouse too late, and as a result, effect the insertion of the marker at a point in time after which the next portion has already begun. The user thus has a need for a way to correct the location of the erroneously inserted marker so as to coincide with the intended location.

For example, FIG. 1 shows audio information in the form of an analog audio signal 100, having a first silent portion 110, a non-silent portion 120 and a second silent portion 130. A first transition point 119 exists between the first silent portion 110 and the non-silent portion 120. A second transition point 129 exists between the silent portion 130 and the non-silent portion 120. A user decides she wants to insert a replay starting point before the beginning of the non-silent portion 120 (e.g., at point 111). As noted above, the user may press a button or click a mouse, etc., at the desired time. However, the user may not press the button quickly enough (e.g., prior to the end of the first silent portion 110) to insert the marker at the desired time. Instead, the user acts too late and presses the button at a time during the non-silent portion 120, and as a result the marker is inserted at point 121. Consequently, the user needs a way to correct for her unintentional mistake.

SUMMARY OF THE INVENTION

Exemplary embodiments of the present invention may overcome the above disadvantages and other disadvantages not described above. However, the present invention is not required to overcome the disadvantages described above, and an exemplary embodiment of the present invention may not overcome any of the problems described above.

An aspect of the present invention provides a method for setting a marker within audio information which includes a plurality of silent portions and a non-silent portion, the method including: receiving the audio information including the plurality of silent portions and the non-silent portion; receiving a selection for a selected marker insertion point; determining, based on the received selection and received audio information, whether the selected marker insertion point occurs during the non-silent portion; and if the selected marker insertion point occurs during the non-silent portion, determining a time of a silent portion from among the plurality of silent portions in the received audio signal, and setting the marker to correspond to the determined time of the silent portion.

The method may further include changing the selected marker insertion point to correspond with the set marker.

The time of the silent portion may occur before the selected marker insertion point.

The time of the silent portion may be closest in time to the selected marker insertion point from among the plurality of silent portions.

The audio information may be in a digital format.

The selection for the selected marker insertion point may be performed by a user.

The non-silent portion of the audio information may include at least one spoken word.

The determining of the time of the silent portion may be based on an analysis of the non-silent portion of the audio information.

The non-silent portion of the audio information may include at least one spoken word and the analysis of the non-silent portion is based on a recognition of the at least one spoken word.

The recognition of the at least one spoken word may be performed by comparing the non-silent portion of the audio information to at least one word in a word database.

Each silent portion of the plurality of silent portions may be longer than a minimum duration.

The determining of the time of the silent portion may be performed by a user.

The method may further include displaying a display screen which displays a graphical representation of the non-silent portion and the silent portion, wherein the user performs the determining of the time of the silent portion by manually selecting the time of the silent portion on the displayed graphical representation.

The method may further include displaying a marker on the display screen, wherein the displayed marker corresponds to the selected marker insertion point, and wherein the manually selecting of the time of the silent portion on the displayed graphical representation includes moving the displayed marker within the displayed graphical representation.

The audio information may include a plurality of spoken words, and the silent portion may correspond to a pause between at least two words from the plurality of spoken words.

Another aspect of the present invention provides an apparatus for setting a marker within audio information which includes a plurality of silent portions and a non-silent portion, wherein the apparatus may include: a receiver operable to receive the audio information including the plurality of silent portions and the non-silent portion; an input unit operable to receive a selection for a selected marker insertion point; a controller operable to determine, based on the received selection and received audio information, whether the selected marker insertion point occurs during the non-silent portion, wherein if the selected marker insertion point occurs during the non-silent portion, the controller determines a time of a silent portion from among the plurality of silent portions in the received audio signal, and sets the marker to correspond to the determined time of the silent portion.

The controller may further change the selected marker insertion point to correspond with the set marker.

The input unit may receive the selection for the selected marker insertion point from a user.

The controller may determine the time of the silent portion based on an analysis of the non-silent portion of the audio information.

The controller may perform the determining of the time of the silent portion based on an input by a user.

The apparatus may further include displaying a display screen which displays a graphical representation of the non-silent portion and the silent portion, wherein the controller performs the determining of the time of the silent portion by manually selecting the time of the silent portion on the displayed graphical representation.

The apparatus may further include displaying a marker on the display screen, wherein the displayed marker corresponds to the selected marker insertion point, and wherein the manually selecting of the time of the silent portion on the displayed graphical representation includes moving the displayed marker within the displayed graphical representation.

Another aspect of the present invention includes a method for setting a marker within audio information having a silent portion and a non-silent portion, wherein the non-silent portion includes at least one of verbal and non-verbal content, wherein the method includes: receiving the audio information having the silent portion and the non-silent portion; receiving a selection from a user for setting the marker to correspond to a first time, wherein the first time occurs during the non-silent portion; analyzing the audio information to determine at least one of a duration of the non-silent portion, a start time for the non-silent portion, an end time for the non-silent portion, a start time for the silent portion, an end time for the silent portion and the at least one of the verbal and non-verbal content; determining a second time based on the analyzing of the non-silent portion, wherein the second time occurs during the silent portion; and setting the marker to correspond to the determined second time.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

As used herein, the phrase "replay starting point" includes not only a point in time that a user might wish to mark for replaying desired audio information, but more generally includes a place marker set by a user, which can be used for other purposes besides simply replaying desired audio information. For example, a user may wish to mark every occurrence of a word or phrase, etc., for determining a total number of occurrences of the word or phrase throughout the entirety of the audio information analyzed. Alternatively, a user might want to mark certain elements for deletion. Many other applications are possible. Consequently, the phrase "replay starting point," as used herein, is not limited to the application of replaying audio information. Additionally, the term "marker" is used interchangeably herein with the phrase "replay starting point."

Figure 1:
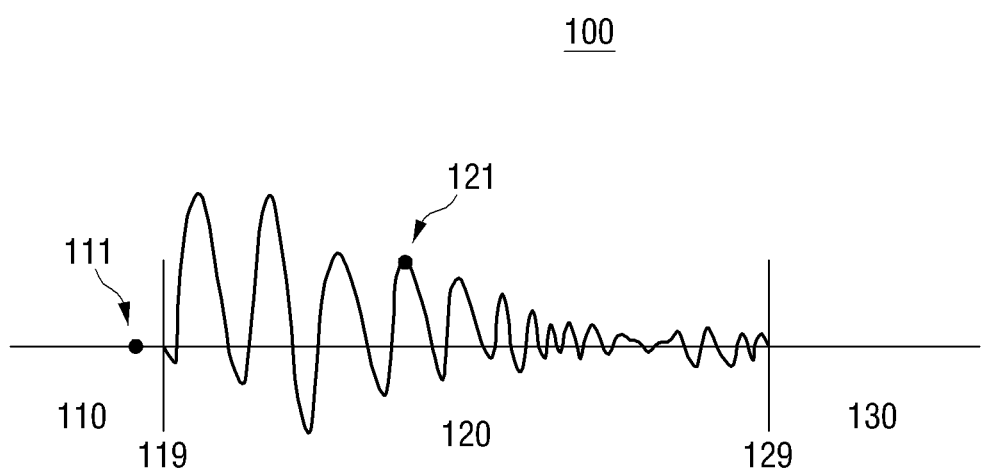
FIG. 1 illustrates an example of an audio signal having a non-silent portion and silent portions.
Figure 2:
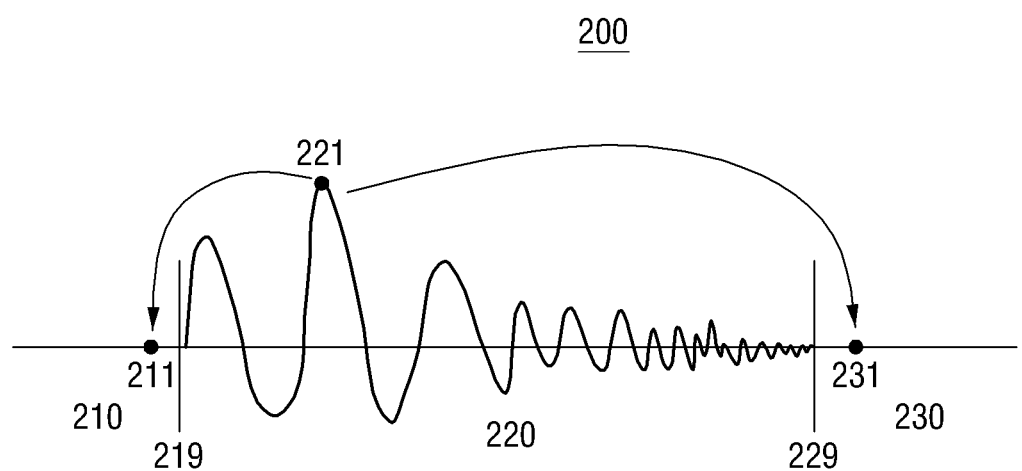
FIG. 2 illustrates an example of an operation according to an exemplary embodiment of the present invention.

FIG. 2 shows audio information 200 in the form of an audio signal similar to the signal shown in FIG. 1. As noted above with respect to FIG. 1, a user may desire to insert a first silent portion 210, a non-silent portion 220 and a second silent portion 230. A first transition point 219 exists between the first silent portion 210 and the non-silent portion 220. A second transition point 229 exists between the second silent portion 230 and the non-silent portion 220. A user decides she wants to insert a replay starting point before the beginning of the non-silent portion 220 (e.g., at point 211). As noted above, the user may press a button or click a mouse, etc., at the desired time. Again, as noted above, the user may not press the button quickly enough (e.g., prior to the end of the first silent portion 210) to insert the marker at the desired time. Instead, the user acts too late and presses the button at a time during the non-silent portion 220, and as a result the marker is inserted at point 221.

It should be noted that the phrase "audio signal," as used herein, is merely used chosen for convenience. However, the present invention is not limited to an audio "signal," per se. Instead, the present invention applies more broadly to audio information in general, i.e., analog signals, as well as digital data. Therefore, as used herein, the phrase "audio signal" is used interchangeably with the term "audio information."

Exemplary embodiments of the present invention can correct for this unintentional mistake. For example, the marker can be moved from the point 221 in the non-silent portion 220 to a point in the first silent portion 210, or alternatively, to a point in the second silent portion 230. It should be noted that that the marker can also be moved to the first transition point 219 or the second transition point 219, or for that matter, anywhere in either silent portion (i.e., not just to point 211 or 231).

In other words, if the start time and end time of a silent portion is known (or start/end time and duration), it is possible to move the marker to any desired part of the silent portion, i.e., beginning, middle or end. Thus, if a silent portion last from time 00:00 to 00:10, for example, the marker may be placed at anytime between 00:00 and 00:10, inclusively.

In further reference to FIG. 2, according to an exemplary embodiment of the present invention, the audio information can be analyzed to determine whether the original marker has been erroneously inserted in non-silent portion 220, and if so, determine where silent portions are located (e.g., 210 and 230), i.e., to which the erroneously placed marker can be moved.

For example, the level of any part of an audio signal within the non-silent portion (i.e., for any given point in time) 220 can be compared to some minimum threshold value (e.g., greater than or equal to 0), such that a determination can be made as to whether the audio signal at that given point in time can be classified as being part of a non-silent portion, or alternatively, a silent portion. Once a particular part of a signal can be classified as silent or non-silent, it becomes possible to determine other characteristic information of the overall audio signal: the duration of a non-silent portion, the duration of a silent portion, a begin/end time for a silent/non-silent portion, a total number of silent/non-silent portions, the average length of silent/non-silent portions, etc.

Similarly, given a particular level of an audio signal at a particular point in time, it is possible to estimate the probability of whether the next point in time is going to be part of a silent portion or a non-silent portion. Moreover, by analyzing accumulated audio information, patterns may be detected within the received audio information. For example, the received audio information may include a phrase which is repeated throughout. As such, it is possible to recognize that a given data point occurs within a non-silent portion of predictable duration (i.e., given the determinable patterns within the previously acquired audio information). Therefore, if a user inserts a replay marker at one of these times within a non-silent portion, a correction may occur automatically, based on the determined pattern, such that the marker can be automatically moved to an appropriate non-silent portion.

More specifically, as noted above, the non-silent portion may include verbal and non-verbal information. Verbal information includes spoken words, and thus, the non-silent portion of the audio information may include at least one spoken word. The silent portion may correspond to a pause between at least two words/syllables/sentences (i.e., a plurality of spoken words), for example. Again, as noted above, it is possible to determine a time (i.e. location within the audio signal) of a given silent portion based on an analysis of the non-silent portion of the audio information. In the case of the non-silent portion of the audio information including at least one spoken word, the analysis of the non-silent portion may be based on a recognition of the at least one spoken word. For example, the recognition of the at least one spoken word may be performed by comparing the non-silent portion of the audio information to at least one word in a word database. In this way, a non-silent portion may be analyzed to determine a beginning/ending point, and thus, to also determine the beginning/ending point of an adjacent silent portion. This process could be repeated throughout all of the available audio information so as to determine the locations of all of the silent/non-silent portions contained therein.

However, this sort of pattern recognition does not have to be limited to the determining of patterns of silent/non-silent portions within a received audio signal. Instead, a user may make repeated manual corrections for her erroneous insertions of replay markers, and thereby create a pattern of behavior, i.e., a history. As such, it is also possible to recognize such patterns in the user's actions. For example, if the user repeatedly moves an erroneously inserted replay marker from a non-silent portion to a next silent portion (as opposed to a previous silent portion), or to a silent portion having some minimum duration, for example, such a preferential pattern may be detected and applied automatically to correct erroneously inserted markers occurring in the future.

With respect to non-verbal information (e.g., music), it is also possible to analyze characteristics of the audio signal to determine patterns therein. For example, for a given music signal, characteristic like frequency, volume level, tempo, etc., can be determined, and then used to identify silent/non-silent portions. Further, these sort of signal characteristics may also be used to detect patterns within the non-verbal information, and thus be used to predict where silent/non-silent portions are within the received signal (i.e., with respect to a location of erroneously inserted marker).

Figure 3:
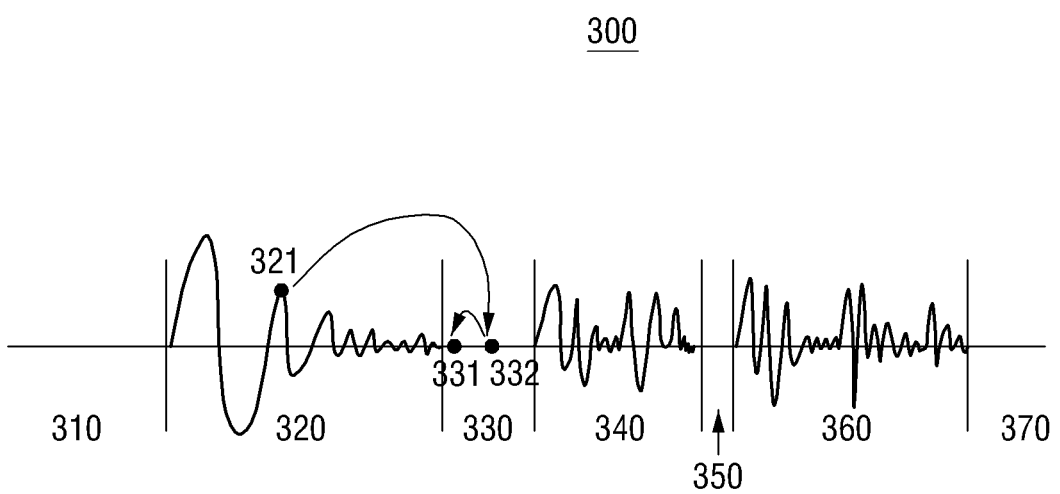
FIG. 3 illustrates an example of an audio signal according to an exemplary embodiment of the present invention.

FIG. 3 shows an example of a received audio signal 300 which is more complex than the examples of FIGS. 1 and 2. As shown in FIG. 3, the audio signal 300 may include multiple non-silent portions 310, 330, 350 and 370, and multiple silent portions 320, 340 and 360. In this example, it can be seen that each of the silent and non-silent portions may be of different duration, and of varying characteristics (i.e., with respect to the non-silent portions). In the case where the audio signal includes a plurality of silent/non-silent portions (such as shown in FIG. 3), each silent/non-silent portion of the plurality of silent/non-silent portions may be longer than a minimum duration.

According to an exemplary embodiment of the present invention, if a marker is erroneously inserted at any of the non-silent portions 310, 330, 350 or 370, it may be moved to any one of the silent portions 320, 340 or 360, regardless in which non-silent portion the insertion of an erroneously placed marker occurs.

For example, an audio signal may be received and stored in a memory. Then if a user erroneously inserts a replay marker in non-silent portion 360, an exemplary embodiment of the present invention may determine the occurrence of the erroneously placement in non-silent portion 360, and then move the marker to the silent portion 310 (or any of the other available silent portions 330, 350 and 370). In other words, the entire audio signal 300 can be stored, analyzed to determine the location and duration of each of the silent and non-silent portions (310-370), and in the event of an erroneous marker insertion by a user into a non-silent portion, the marker may be moved to some silent portion, which may be determined automatically based on some user preference (e.g., the silent portion which is nearest in time to the non-silent portion in which the marker was erroneously inserted, the silent portion which is shortest/longest in duration, the silent portion which is of a certain minimum duration, etc.). Note that the time of a silent portion within an audio signal may occur before or after a given non-silent portion. Thus, a marker may be moved before or after a given non-silent portion.

Furthermore, an exemplary embodiment of the present invention may allow a user to set a priority as to among which silent portion is preferred as the place to move the erroneously placed marker. For example, referring again to FIG. 3, a user may insert a marker at point 321. The user may have preselected the preferred silent portion to move the marker to as being whichever silent portion occurs closest in time following the non-silent portion in which the marker has been erroneously inserted. In this case, that would correspond to the silent portion 330, so that the marker would be moved from point 321 to point 332.

It may also be desirable to move a marker even further back within a target silent portion. For example, a user erroneously inserts a marker at point 321. The marker is then moved to the next silent portion (e.g., via a predetermined preference setting, manual movement operation performed by the user, etc.) to point 332. However, the duration of the silent portion between the point 332 and the beginning of the next non-silent portion 340 may not be long enough to allow for a smooth transition during replay operation. That is, if the marker inserted at point 332 represents a replay starting point, for example, and the replay operation is initiated, the replay of non-silent portion 340 may occur too abruptly due to the small duration of time between the point 332 and the beginning of non-silent portion 340.

Therefore, it may be desirable to automatically move the marker further back in the silent portion 330 so as to create a smoother transition (e.g., during a replay operation). For example, as shown in FIG. 3, the corrected marker insertion point 332 may be shifted back to point 331 within silent portion 330. Such an automatic operation could be selected as a user preference, for example.

Alternatively, according to another exemplary embodiment of the present invention, a hierarchy of choices could be made with respect to how to move an erroneously placed replay marker. For example, a preferred silent portion might be designated as being any silent portion which is longer than X seconds, and an alternate silent portion might correspond to whichever silent portion occurs closest in time following the non-silent portion in which the marker has been erroneously inserted. In this case, if there were no silent portions longer than X seconds, the alternate preference could be implemented.

Figure 4A:
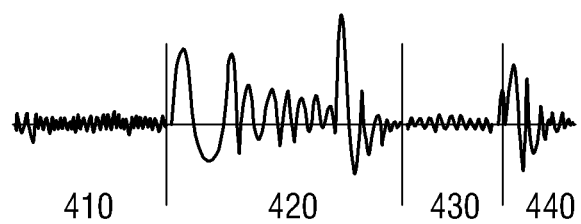
FIG. 4A illustrates an example of an audio signal according to an exemplary embodiment of the present invention.

As noted above, an exemplary embodiment of the present invention may audio signals of varying levels. As used herein, the term "level" is not limited to one specific parameter. Instead, the term "level" includes a volume level, a bass frequency level, a treble frequency level, a noise level, etc. For example, the received audio signal FIG. 4A shows an audio signal 400 having several non-silent portions, 410, 420, 430 and 440, of varying volume levels. Specifically, the audio signal in non-silent portions 410 and 430 is at relatively low levels in comparison to non-silent portions 420 and 440.

Figure 4B:
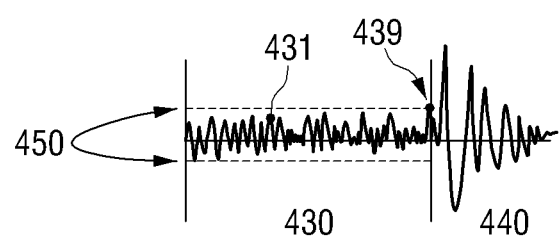
FIG. 4B illustrates an example of an operation according to an exemplary embodiment of the present invention.

FIG. 4B shows an expanded view of non-silent portions 430 and 440. As shown in FIG. 4B, non-silent portion 430 has a relatively low volume level as compared to non-silent portion 440. As noted above, any part of an audio signal within the non-silent portion (i.e., for any given point in time) can be compared to some minimum threshold value (e.g., greater than or equal to 0), such that a determination can be made as to whether the audio signal at that given point in time can be classified as being part of a non-silent portion, or alternatively, a silent portion. If for example, a minimum threshold level is chosen such as level 450 shown in FIG. 4B, and a user inserts a marker at point 431, a determination can be made that point 431 lies within a silent portion, since it the audio signal at point 431 is not greater than the minimum threshold level 450. Conversely, point 439 would be a point at which the audio signal would be considered to be above the minimum threshold 450, and thus, part of a non-silent portion. Thus, it is possible to specify the level at which a signal would be considered as being part of a silent portion versus a non-silent portion. More specifically, a user may manually specify a minimum threshold level, or the level may be predetermined.

Figure 5:
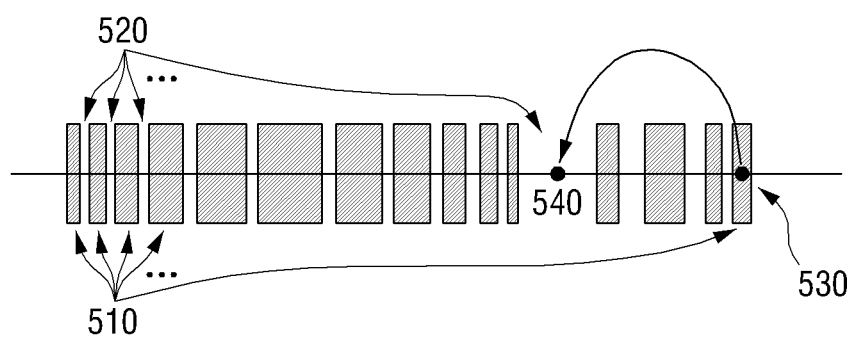
FIG. 5 illustrates an example of a digital signal according to an exemplary embodiment of the present invention.

As noted above, the received audio information does not have to be in analog form. Instead, the received audio information maybe in digital form. FIG. 5 shows an example of audio information represented in digital form, i.e., as a digital signal 500. As shown in FIG. 5, several non-silent portions are labeled collectively as 510. Similarly, several silent portions are labeled collectively as 520. A user erroneously selects to insert a marker at point 530, i.e., during a non-silent portion, while intending to insert the marker at point 540. However, an exemplary embodiment of the present invention may recognize that the marker was erroneously inserted into a non-silent portion at point 530, and then move the marker to a silent portion at point 540.

As noted above with respect to an analog signal, it is likewise possible to determine which portions are non-silent and which portions are silent in a digital signal. For example, a potential non-silent portion could be analyzed to determine whether the signal has a non-zero value. Likewise, a potential silent portion could be analyzed to determine whether the signal has a zero value (or a value below some minimum value). It should be noted that the digital signal 500 shown in FIG. 5 is merely one type of digital signal, which is modulated in one particular way. However, the present invention is not limited thereto. Other types of digital signals, i.e., which are modulated in different ways, are also possible.

Figure 6:
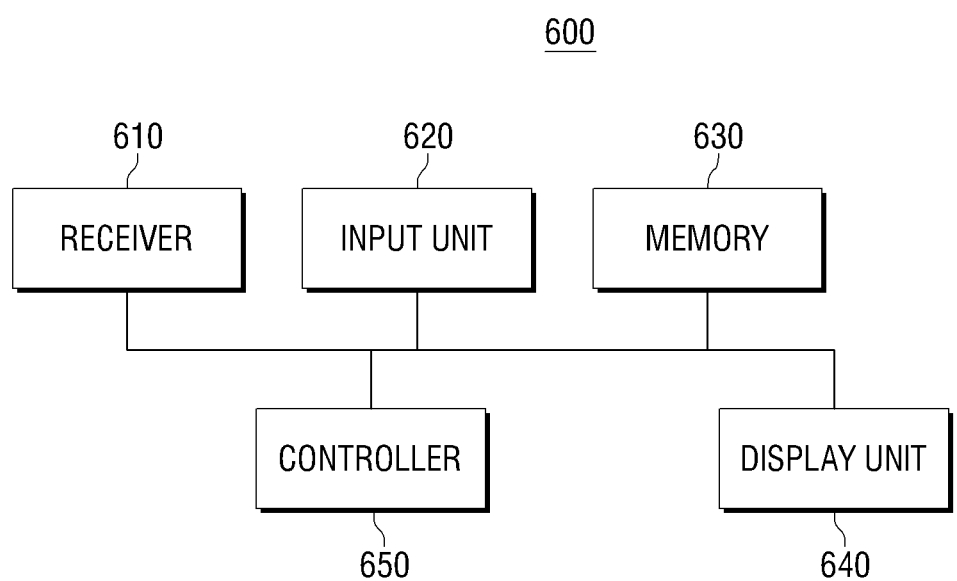
FIG. 6 illustrates an example of an apparatus according to exemplary embodiment of the present invention.

FIG. 6 shows an example of an apparatus 600 according to an exemplary embodiment of the present invention, including a receiver 610 which is operable to receive an audio signal, an input unit 620 which is operable to receive an input from a user (e.g., to insert a marker into the received audio signal, to set a threshold value for determining a particular portion as being a silent/non-silent portion, to set a priority for moving erroneously inserted markers, etc.), a memory 630 which is operable to store the received audio signal, marker settings, user preferences, etc., a display unit which is operable to display the received audio signals, a user interface for view the signal and moving/setting markers, setting preferences, etc., and a controller (650) which is operable to control the receiver 610, the input unit 620, the memory 630 and the display unit 640.

It should be noted that although FIG. 6 shows everything as being within a single apparatus 600, the present invention is not limited thereto. Instead, an exemplary embodiment of the present invention might be distributed in the form of a system.

The display unit 640 can also display a graphical representation of the audio information and the markers, including the erroneously inserted marker, as well as the moved marker. A user can therefore use the display unit 640 to view and manipulate the audio information and the markers (e.g., selecting the erroneously inserted marker and moving the marker to a desired silent portion), as well as to set other preferences (such as setting a preferred order for target silent portions, selecting which operations to perform manually/automatically, etc.).

Figure 7:
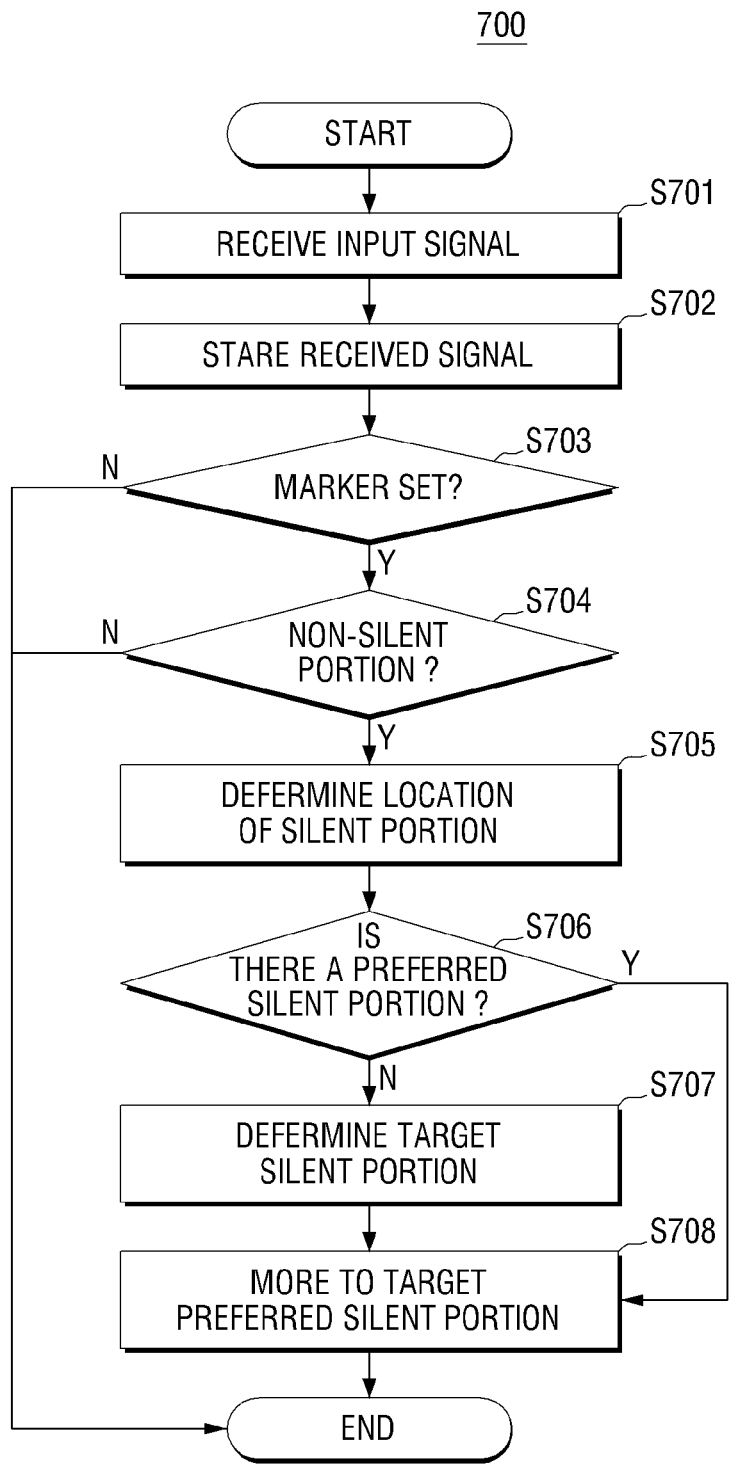
FIG. 7 illustrates an example of an operation according to an exemplary embodiment of the present invention.

FIG. 7 illustrates an example of an operation 700 according to an exemplary embodiment of the present invention. As shown in FIG. 7, an input signal is received in operation S701. As noted above, the input signal is an audio signal and may be of analog or digital form. The received signal may be then stored in operation S702 for later reference.

It should be noted that although FIG. 7 shows storing the received signal in operation S702, it does not have to be stored in its entirety. That is, it is possible that an exemplary embodiment of the present invention may receive an input signal, store minimal information (e.g., location information for inserted markers), and then analyze the received input signal as it is received.

Next, in operation S703, a determination is made as to whether the user has inserted a marker. If so, a determination is made in operation S704 as to whether the marker has been inserted into a non-silent portion. As noted above, the determination of the presence of a non-silent marker can be accomplished in various ways. If the marker has been inserted into a non-silent portion, a determination is made as to the location of all silent portions in the received audio signal (S705). Alternatively, a determination may be made as to the location of a single silent portion. It should further be noted that the location of the silent portions may also be determined by determining the location of the non-silent portions in the received audio signal (i.e., and deduced by knowing the location of all non-silent portions).

Then, a determination is made as to whether there is a preferred silent portion (S706) (e.g., closest in time, shortest duration, etc.). If not, a target silent portion is selected (S707).

Finally, the erroneously inserted marker is moved to the target/preferred silent portion (S708).

It should be noted that some of the operations noted above may be omitted, combined and/or performed in different orders than shown in FIG. 7. Further, some of the operations described above can either be performed manually by a user. For example, a user can make the initial selection of where to insert a marker, choose the location of the non-silent portion to which the marker should be moved, move the marker, etc. Alternatively, the operations described above can be performed automatically.

The present invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, 30 DVDs, etc.). Hence, the present invention may be embodied on a computer-readable medium.

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for setting a marker within an audio signal for setting a replay section, the method comprising:
    receiving a user command for selecting a marker insertion point which is a point at a particular point in time in the audio signal;
    comparing a signal portion corresponding to the selected marker insertion point with a predetermined threshold value to determine whether the selected marker insertion point exists in a non-silent portion; and
    when the selected marker insertion point exists in the non-silent portion, shifting the selected marker insertion point to a silent portion which is followed by the signal portion or is following the signal portion in the audio signal.

2. The method according to claim 1, wherein a time of the silent portion occurs before the selected marker insertion point.

3. The method according to claim 1, wherein a time of the silent portion is closest in time to the selected marker insertion point from among a plurality of silent portions.

4. The method according to claim 1, wherein the non-silent portion of the audio signal includes at least one spoken word.

5. The method according to claim 1, wherein the shifting the selected marker insertion point comprises determining a time of the silent portion based on an analysis of the non-silent portion of the audio signal.

6. The method according to claim 5, wherein the non-silent portion of the audio signal includes at least one spoken word and the analysis of the non-silent portion is based on a recognition of the at least one spoken word.

7. The method according to claim 6, wherein the recognition of the at least one spoken word is performed by comparing the non-silent portion of the audio signal to at least one word in a word database.

8. The method according to claim 1, wherein the silent portion is longer than a minimum duration.

9. The method according to claim 5, wherein the determining of the time of the silent portion is performed by a user.

10. The method according to claim 9, further comprising displaying a display screen which displays a graphical representation of the non-silent portion and the silent portion,
    wherein the user performs the determining of the time of the silent portion by manually selecting the time of the silent portion on the displayed graphical representation.

11. The method according to claim 10, further comprising displaying a marker on the display screen, wherein the displayed marker corresponds to the selected marker insertion point, and
    wherein the manually selecting of the time of the silent portion on the displayed graphical representation includes moving the displayed marker within the displayed graphical representation.

12. The method according to claim 1, wherein the audio signal includes a plurality of spoken words, and the silent portion corresponds to a pause between at least two words from the plurality of spoken words.

13. An apparatus for setting a marker within an audio signal for setting a replay section, the apparatus comprising:
    a receiver operable to receive the audio signal including a plurality of silent portions and a non-silent portion;
    an input unit operable to receive a user command for selecting a marker insertion point which is a point at a particular point in time in the received audio signal;
    a controller operable to compare a signal portion corresponding to the selected marker insertion point with a predetermined threshold value to determine whether the selected marker insertion point exists in the non-silent portion,
    wherein when the selected marker insertion point exists in the non-silent portion, the controller shifts the selected marker insertion point to a silent portion which is followed by the signal portion or is following the signal portion in the received audio signal.

14. The apparatus according to claim 13, wherein a time of the silent portion occurs before the selected marker insertion point.

15. The apparatus according to claim 13, wherein a time of the silent portion is closest in time to the selected marker insertion point from among the plurality of silent portions.

16. The apparatus according to claim 13, wherein the non-silent portion of the audio signal includes at least one spoken word.

17. The apparatus according to claim 13, wherein the controller determines a time of the silent portion based on an analysis of the non-silent portion of the audio signal.

18. The apparatus according to claim 17, wherein the non-silent portion of the audio signal includes at least one spoken word and the analysis of the non-silent portion is based on a recognition of the at least one spoken word.

19. The apparatus according to claim 18, wherein the recognition of the at least one spoken word includes a comparing operation which compares the non-silent portion of the audio signal to at least one word in a word database.

20. The apparatus according to claim 13, wherein each silent portion of the plurality of silent portions is longer than a minimum duration.

21. The apparatus according to claim 13, wherein the controller determines a time of the silent portion based on an input by a user.

22. The apparatus according to claim 21, further comprising a display unit which displays a graphical representation of the non-silent portion and the silent portion, wherein the controller determines the time of the silent portion based on the user manually selecting the time of the silent portion on the displayed graphical representation.

23. The apparatus according to claim 22, wherein the display unit displays a marker which corresponds to the selected marker insertion point, and wherein the manually selecting of the time of the silent portion on the displayed graphical representation includes moving the displayed marker within the displayed graphical representation.

24. The apparatus according to claim 13, wherein the audio signal includes a plurality of spoken words, and the silent portion corresponds to a pause between at least two words from the plurality of spoken words.

25. A method for setting a marker within an audio signal for setting a replay section, wherein a non-silent portion includes at least one of verbal and non-verbal content, the method comprising:
   receiving the audio signal having a silent portion and the non-silent portion;
   receiving a user command from a user for setting the marker to correspond to a point at a first time, wherein the first time exists in the non-silent portion;
   analyzing the audio signal to determine at least one of a duration of the non-silent portion, a start time for the non-silent portion, an end time for the non-silent portion, a start time for the silent portion, an end time for the silent portion and the at least one of the verbal and non-verbal content;
   determining a second time based on the analyzing of the non-silent portion, wherein the second time exists in the silent portion; and
   shifting the marker to correspond to a first time to the silent portion which is followed by a signal portion or is following the signal portion.

26. The method according to claim 5, wherein the determining a time of the silent portion includes determining a start time and an end time of the selected silent portion.

27. The method according to claim 1, wherein the audio signal is an analog signal.

28. The method according to claim 5, further comprising:
   receiving an another user command for selecting an another marker insertion point; and
   repeatedly replaying a period between the determined time and a time corresponding to the another marker insertion point.

29. The apparatus according to claim 13, wherein the input unit receives an another user command for selecting an another marker insertion point, and the controller repeatedly replays a period between a determined time and a time corresponding to the another marker insertion point.

30. The method according to claim 1, wherein the comparing a signal portion corresponding to the selected marker insertion point with a predetermined threshold value is a comparing signal intensity at the selected marker insertion point with a predetermined signal intensity.

31. The method according to claim 1, wherein a point in the silent portion to which the selected marker insertion point shifted is determined based on time duration between the point in the silent portion and a beginning of a non-silent portion.

32. The method according to claim 1, further comprising a plurality of silent portions and periods of the plurality of silent portions are non-equal in time.

* * * * *